United States Patent [19]
Davis et al.

[11] Patent Number: 5,828,471
[45] Date of Patent: Oct. 27, 1998

[54] ILLUMINATION SYSTEM AND DISPLAY DEVICE

[75] Inventors: Gillian Margaret Davis, Oxfordshire; Kathryn Walsh, Reading; Paul May, Cambridge, all of United Kingdom

[73] Assignee: Sharp Kabushiki Kaisha, Osaka, Japan

[21] Appl. No.: 579,563

[22] Filed: Dec. 27, 1995

[30] Foreign Application Priority Data

Dec. 29, 1994 [GB] United Kingdom ................... 9426330

[51] Int. Cl.$^6$ .............................. G02B 5/32; G02B 5/30; G03H 1/00; G02F 1/1335
[52] U.S. Cl. .................................. 359/15; 359/1; 359/487; 359/494; 359/495; 359/498; 349/61; 349/64; 349/62
[58] Field of Search ................................. 359/15, 1, 487; 359/494, 495, 498; 349/63, 64, 65, 66, 18, 9, 57, 61

[56] References Cited

U.S. PATENT DOCUMENTS

| | | | |
|---|---|---|---|
| 4,798,448 | 1/1989 | van Rualte et al. | 350/345 |
| 5,013,107 | 5/1991 | Biles | 359/15 |
| 5,113,285 | 5/1992 | Franklin et al. | 359/465 |
| 5,161,039 | 11/1992 | Schellenberg | 359/15 |
| 5,221,982 | 6/1993 | Faris | 359/93 |
| 5,410,421 | 4/1995 | Huignard et al. | 359/15 |
| 5,535,055 | 7/1996 | Ono et al. | 359/494 |

FOREIGN PATENT DOCUMENTS

| | | |
|---|---|---|
| 0467447 | 1/1992 | European Pat. Off. . |
| 0492636 | 7/1992 | European Pat. Off. . |
| 0573905 | 12/1993 | European Pat. Off. . |
| 0597261 | 5/1994 | European Pat. Off. . |
| 5-27226 | 2/1993 | Japan . |
| 6281932 | 10/1994 | Japan . |
| 9209915 | 6/1992 | WIPO . |

OTHER PUBLICATIONS

European Search Report for Application No. 95309517.1; dated Mar. 7, 1997.
Search Report for GB Appl. 9426330.8, mailed Mar. 13, 1995.
Yakolev et al, 13th Intl. Disp. Res. Conf., Aug. 31–Sep. 3, 1993, SID, pp. 17–20, "New Concept to Achieve Color LCDs with linearly Photopolymerized (LPP) LCD–Substrates".
US Application Serial No. 08/525,297, filed Sep. 7, 1995, Walsh et al.

*Primary Examiner*—Jon W. Henry
*Assistant Examiner*—Audrey Chang

[57] ABSTRACT

An illumination system includes a polarization selective holographic element, which includes at least one optically anisotropic material, arranged to separate light of a first polarization type from light of a second polarization type, and converting section for converting light of at least one of the first and second polarization types to light of a common polarization type. Where the polarization selective holographic element separates two orthogonal components of plane polarized light from one another, the converting section can include a polarization rotator, for example a half wave plate, or alternatively a quarter wave plate and a reflector arranged to reflect light back through the quarter wave plate. Where the polarization selective holographic element separates opposite handed components of circularly polarized light, the converting section can include a reflector.

26 Claims, 6 Drawing Sheets

ILLUMINATION SYSTEM AND DISPLAY DEVICE

BACKGROUND OF THE INVENTION

1. Field of the Invention

This invention relates to an illumination system for a display device, for example a backlight or edgelight for a liquid crystal display device, and to a display device.

2. Description of the Related Art

In current liquid crystal display devices, the backlight or edgelight which illuminates the liquid crystal device must be polarized. The backlight or edgelight consists of a number of fluorescent tubes which emit unpolarized light, the light passing through a polarizer which absorbs light of one polarization, the remaining light being incident upon a liquid crystal display. It will thus be recognised that approximately 50% of the light emitted by the backlight or edgelight is absorbed before reaching the liquid crystal display.

Additionally, since colour liquid crystal display devices comprise pixels consisting of a triad of liquid crystal cells each of which is associated with a filter that transmits either red, green or blue light, approximately two thirds of the light transmitted by the polarizer is absorbed by the filters.

As a consequence of these two effects, approximately 85% of the light emitted by the backlight or edgelight is absorbed before reaching the liquid crystal display.

In order to reduce the above described problems, devices have been proposed in which one polarization of light incident thereon is converted to match the orthogonal polarization, the output polarized light then being suitable for use in illuminating a liquid crystal display device. Such a device is described in EP 0467447, the device being relatively bulky and suitable for use in a projection display system.

U.S. Pat. No. 5,221,982 discloses an optical element for polarizing light incident thereon, and transmitting different wavelength components of the incident light at different locations, thus removing or reducing the necessity for absorbing colour filters to be provided adjacent the liquid crystal layer of a colour liquid crystal display device. The device uses cholesteric materials in order to separate the different wavelengths and polarization components from one another, and is of a relatively complex nature.

An illumination system for a colour display is also described in U.S. Pat. No. 4,798,448, the system including a birefringent medium arranged to separate the two orthogonal polarizations of plane polarization light from one another. The light transmitted by the birefringent medium is incident upon a diffraction grating which diffracts the different wavelengths of light incident thereon by different amounts, separating the light into different colours. The light transmitted by the diffraction grating is incident upon a patterned half wave plate having first regions which do not alter the polarization of light incident thereon, and second regions arranged to rotate the polarization axis of light incident thereon by 90°. The patterned half wave plate is arranged so that substantially all of the light of one polarization component is incident upon the first regions, light of the orthogonal polarization being incident upon the second regions. The light transmitted by the patterned half wave plate is therefore of uniform polarization, and is separated so that different wavelengths of light are incident upon different parts of a screen or array of liquid crystal cells. This system has the disadvantage of being relatively bulky.

EP 0 597 261, EP 0 573 905, and U.S. Pat. No. 5,221,982 disclose illumination systems for displays in which unpolarised light is split into two orthogonally polarised components. One of the components is converted so as to match the polarisation of the other component.

WO092/09915 discloses an illumination system for a display using holograms. A first hologram separates the polarisations of an incident light beam. The resulting polarised beam is focused by a second hologram on different points of a screen.

According to the present invention there is provided an illumination system as defined in appended claim 1.

SUMMARY OF THE INVENTION

According to a second aspect of the invention, there is provided a display device as defined in the appended claim 24.

Preferred embodiments of the invention are defined in the other appended claims.

It is thus possible to provide an illumination system of compact type which is suitable for use in flat screen liquid crystal display devices and which is of high efficiency since little light is absorbed therein. Such systems are made possible by the use of optically anisotropic materials which allow the holographic element to work over the large angles and large spectral bandwidths necessary for effective use as illumination systems.

BRIEF DESCRIPTION OF THE DRAWINGS OF THE PREFERRED EMBODIMENTS

The invention will further be described by way of example with reference to the accompanying drawings, in which like integers are denoted by like references, and in which.

DETAILED DESCRIPTION

Figure 1:
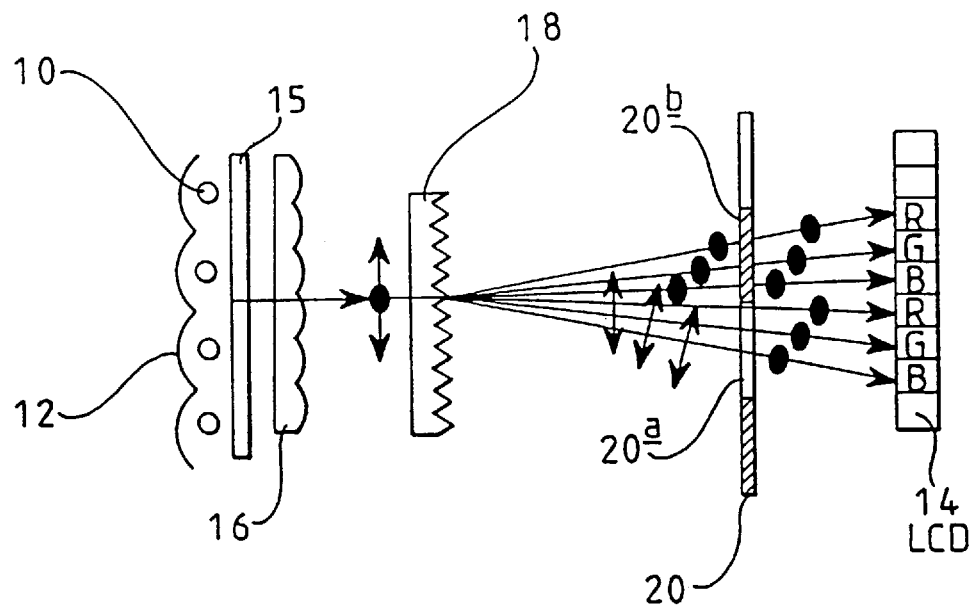
FIG. 1 is a diagrammatic view of an illumination system in accordance with a first embodiment of the invention.

The illumination system illustrated in FIG. 1 comprises a light source 10 in the form of an array of fluorescent tubes or a serpentine tube. The fluorescent tubes are arranged to emit white light composed of red, green and blue components of wavelength falling within bands of approximately 20 nm width centred at 610, 540 and 450 nm, respectively. A reflector 12 such as a metallic mirror is provided behind the fluorescent tubes in order to direct the light towards a liquid crystal display 14. The light emitted by the fluorescent tubes is incident upon a diffuser 15 to provide a uniform intensity, and a lenticular array 16 which focuses the transmitted light onto the cells of the liquid crystal display, reducing the amount of light lost due to the light becoming incident upon the circuit elements of the liquid crystal display.

The light transmitted by the lenticular array 16 is incident upon a thin transmissive polarization selective holographic element 18 which separates the light incident thereon into its three primary colours and separates each colour of light into the two orthogonal planar polarization states. U.S. Pat. No. 5,161,039 describes a transmissive polarization selective holographic element suitable for use in this embodiment.

In FIG. 1 the two polarization components are denoted by a double headed arrow and a dot. The light transmitted by the polarization selective holographic element 18 is incident upon a patterned half wave plate 20 or other patterned polarization rotation device arranged substantially parallel to the polarization selective holographic element 18. The half wave plate 20 is patterned so as to include regions 20a which rotate the axis of polarization of light incident thereon by 90° and regions 20b which do not affect the polarization of light incident thereon.

As shown in FIG. 1, the component of light of one polarization is separated from the other component, one component passing through the regions 20b which do not affect the polarization of light incident thereon, the other component passing through the other regions 20a of the half wave plate 20. In the FIG. 1 embodiment, the component denoted by the dots is not affected by the half wave plate 20, the component denoted by the double headed arrows being rotated by 90°.

In addition to separating the two components of polarization from one another, the polarization selective holographic element 18 diffracts the different wavelengths of light by different amounts. The pixels of the liquid crystal display 14 are arranged so that each pixel receives light of one wavelength from the polarization selective holographic element 18. With this arrangement, there is no need to provide colour filters for the liquid crystal display 14.

Figure 2:
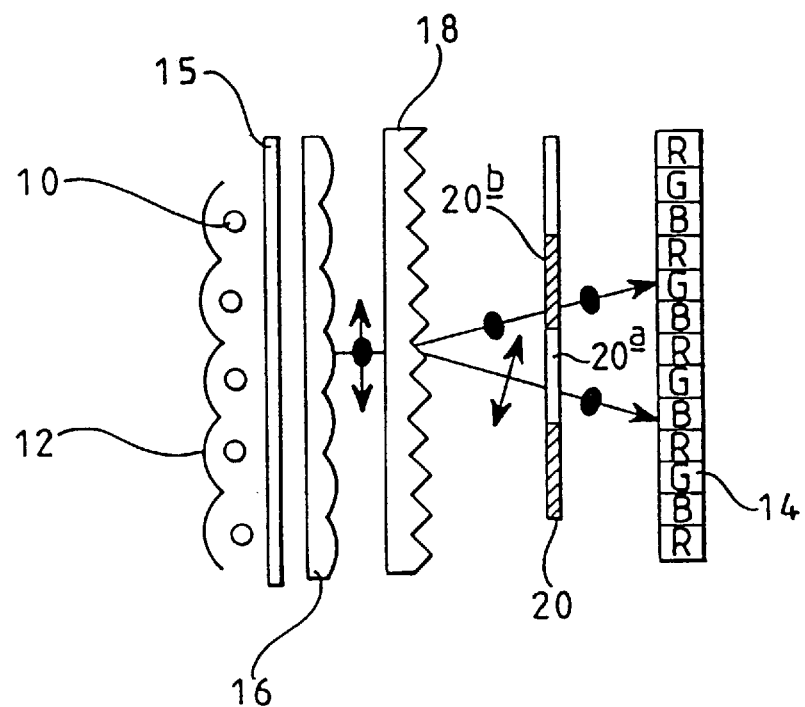
FIG. 2 is a view similar to FIG. 1 of a second embodiment.

The embodiment illustrated in FIG. 2 is similar to that of FIG. 1, the polarization selective holographic element 18 being arranged merely to separate the two components of plane polarization from one another. With this embodiment, the light source 10 is arranged to emit white light. Since each of the pixels of the liquid crystal display 14 receives white light, colour filter elements are required for each of the pixels, the colour filter elements being denoted by the letters R, G and B in FIG. 2.

The embodiments illustrated in FIGS. 1 and 2 may be modified by using a transmissive polarization selective holographic element which transmits the two components of circularly polarized light in different directions, suitable polarization converting means being used instead of the patterned half wave plate 20.

Figure 3:
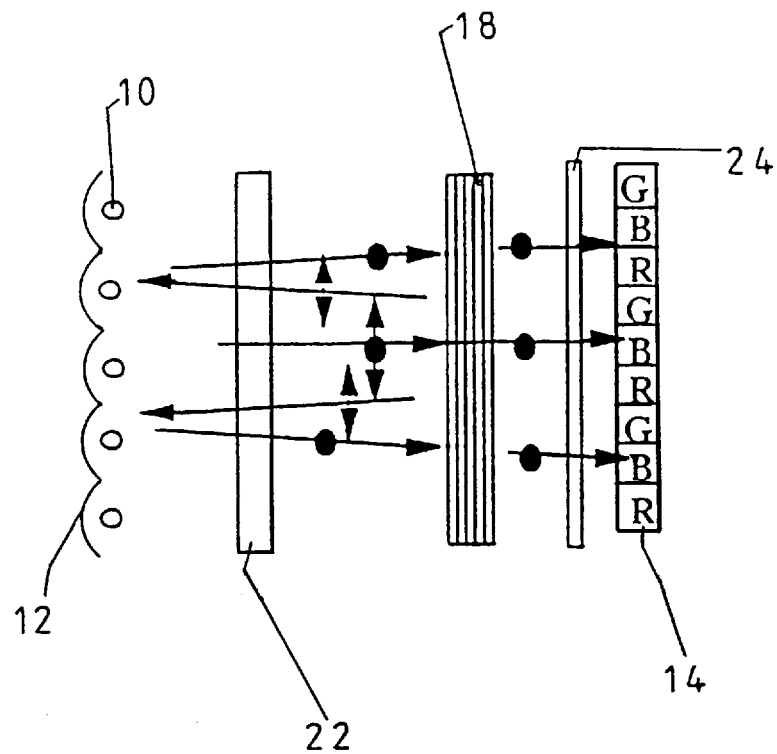
FIG. 3 is a view similar to FIG. 1 of a third embodiment.

The illumination device illustrated in FIG. 3 comprises a light source 10, comprising an array of fluorescent tubes arranged to emit white light, and a reflector 12 behind the fluorescent tubes to reflect the light towards a liquid crystal display device 14. Light emitted by the fluorescent tubes is incident upon a quarter wave plate 22. Since the light emitted by the fluorescent tubes is substantially unpolarized, the quarter wave plate 22 does not have any effect on the polarization state of the light. The light transmitted by the quarter wave plate 22 is incident upon a reflective polarization selective holographic element 18 which transmits one component of plane polarized light and reflects light of the orthogonal polarization. The reflected, now plane polarized, light is incident on the quarter wave plate 22 where it is converted to circularly polarized light of a particular handedness which, on being reflected by the reflector 12, is converted to circularly polarized light of the opposite handedness. On returning through the quarter wave plate 22, the reflected light is converted to plane polarized light having its axis of polarization perpendicular to the axis of polarization which is reflected by the polarization selective holographic element 18. The polarization of the reflected light incident upon the polarization selective holographic element 18 is now of the type transmitted thereby. The light transmitted by the polarization selective holographic element 18 is incident upon a polarization preserving diffuser 24, which acts to distribute the light evenly. The light is then incident upon the liquid crystal display 14 which includes an array of colour filters as denoted by the letters R, G and B.

In the embodiment illustrated in FIG. 3, the polarization selective holographic element 18 is arranged to transmit the component of light denoted by a dot and to reflect the component denoted by a double headed arrow. On returning through the quarter wave plate 22, the component denoted by the double headed arrow is converted to circularly polarized light of a particular handedness, for example right-handed circularly polarized light which on reflection by the reflector, is converted to left-handed circularly polarized light. On passing through the quarter wave plate 22, the left-handed circularly polarized light is converted to light of the polarization denoted by the dot, which can then pass through the polarization selective holographic element 18.

Figure 4:
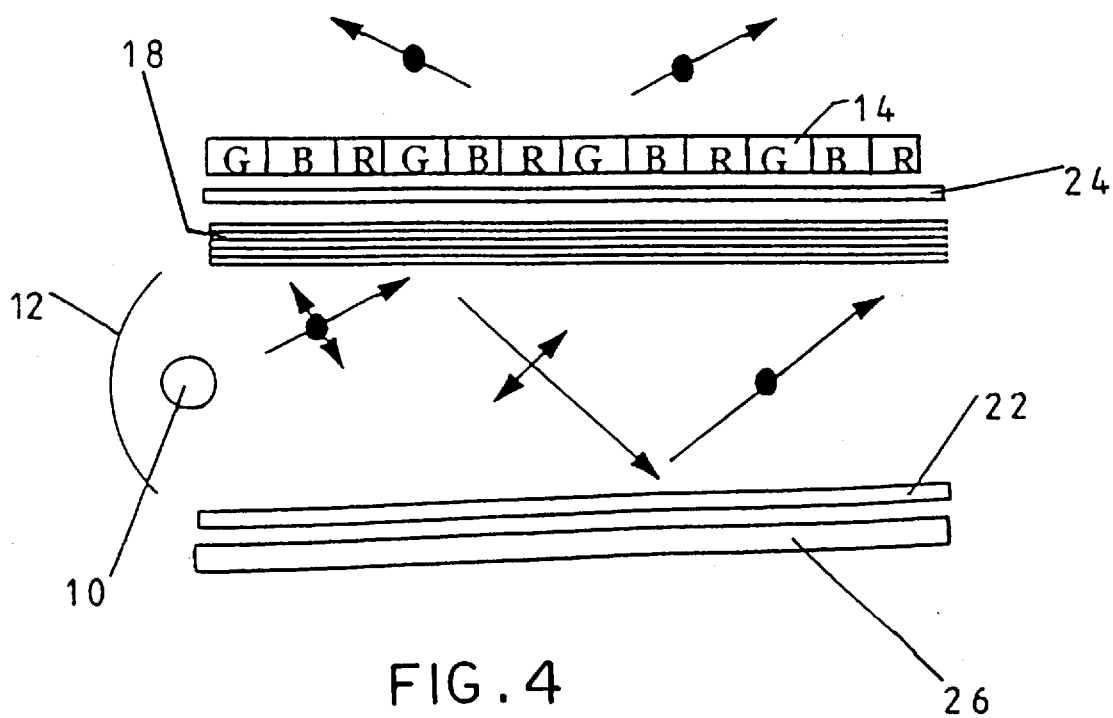
FIG. 4 is a view of an edgelight system similar to the illumination system of FIG. 3.

The embodiments illustrated in FIGS. 1 to 3 are all backlight illumination systems. FIG. 4 illustrates an edgelight system including a light source 10 comprising a fluorescent tube provided with a reflector 12, the fluorescent tube being arranged to emit substantially unpolarized white light. Some of the light emitted by the fluorescent tube is incident directly upon a reflective polarization selective holographic element 18 similar to that illustrated in FIG. 3, the remaining unpolarized light being incident thereon after having passed through a quarter wave plate 22 and reflected by a reflector 26. In the embodiment of FIG. 4, the polarization selective holographic element 18 is arranged to transmit the component of polarized light denoted by a dot, and to reflect the component denoted by a double headed arrow. The reflected light is incident upon the quarter wave plate 22 where it is converted to circularly polarized light of a particular handedness (for example right-handed circularly polarized light). The circularly polarized light is reflected by the reflector 26 and its polarization is converted to circularly polarized light of the opposite handedness (for example left-handed circularly polarized) which, on returning through the quarter wave plate 22, is converted to plane polarized light of the polarization denoted by a dot. This component will then be transmitted by the polarization selective holographic element 18. As with the FIG. 3 embodiment, the light transmitted by the polarization selective holographic element 18 is incident upon a polarization preserving diffuser 24 which distributes the light to a liquid crystal display 14 including suitable colour filters denoted by the letters R, G and B in FIG. 4.

Figure 5:
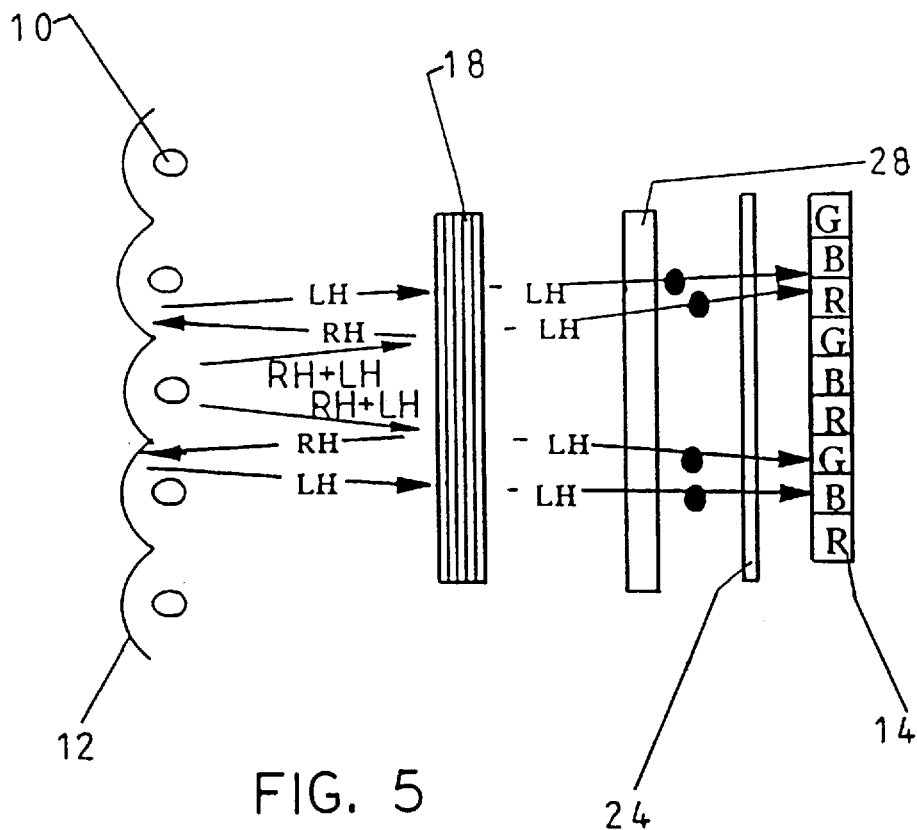
FIG. 5 is a view of an illumination system in accordance with a fifth embodiment of the invention.

FIG. 5 illustrates an Illumination system which comprises a light source 10 in the form of an array of fluorescent tubes arranged to emit white light, a mirror or reflector 12 being provided behind the array of fluorescent tubes to direct the emitted light towards a liquid crystal device 14. The light emitted by the fluorescent tubes is incident upon a reflective polarization selective holographic element 18 which is arranged to transmit circularly polarized light of one handedness, and to reflect circularly polarized light of the opposite handedness. The reflected light is incident upon the reflector 12, whereon it is converted to circularly polarized light of the opposite handedness. In the embodiment of FIG.

5, the polarization selective holographic element 18 is arranged to transmit left-handed circularly polarized light (LH) and to reflect right-handed circularly polarized light (RH). The right-handed circularly polarized light reflected by the polarization selective holographic element 18 is converted to left-handed polarized light on reflection by the reflector 12 and is then transmitted by the polarization selective holographic element 18. The left-handed circularly polarized light transmitted by the polarization selective holographic element 18 is incident upon a quarter wave plate 28 which converts the circularly polarized light to plane polarized light denoted in FIG. 5 by a dot. The plane polarized light is incident upon a polarization preserving diffuser 24 which distributes the light to a liquid crystal display 14 including suitable colour filters.

Figure 6:
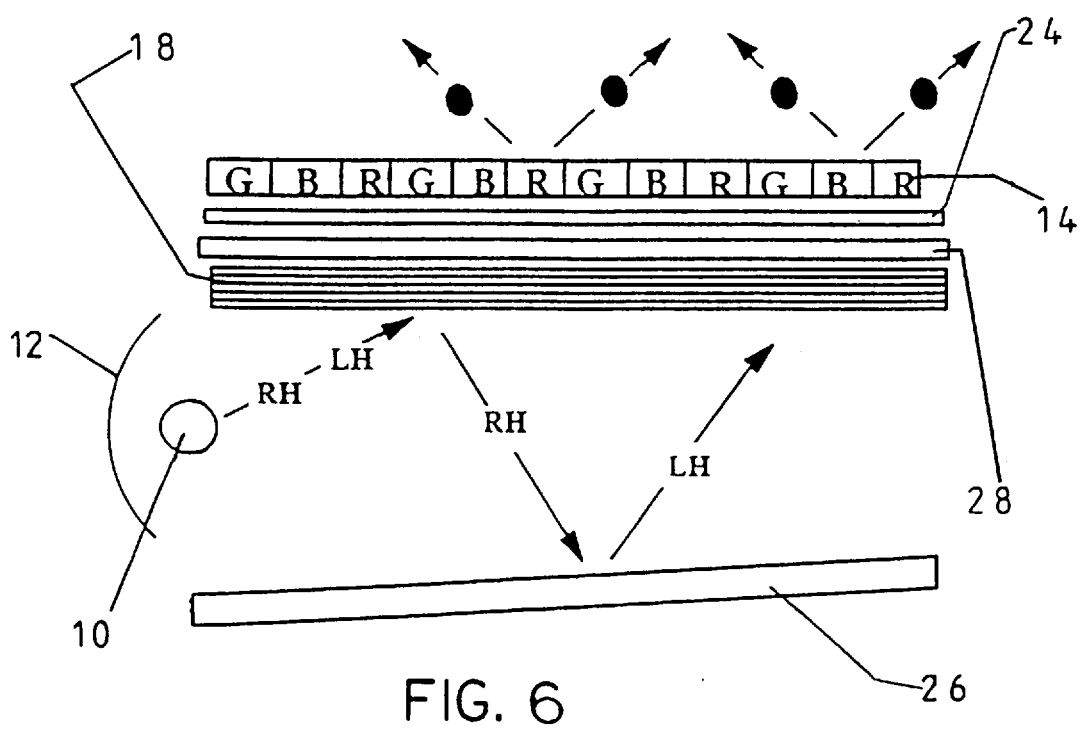
FIG. 6 is a view of an edgelight system similar to the illumination system of FIG. 5.

The illumination system illustrated in FIG. 6 is an edge-light system similar to the backlight system of FIG. 5. Some of the unpolarized light emitted by the light source 10 is incident upon a reflective polarization selective holographic element 18 which is arranged to transmit left-handed circularly polarized light (LH) and reflect right-handed circularly polarized light (RH). The remaining unpolarized light is incident upon the reflective polarization selective holographic element 18 after having been reflected by reflector 26. The right-handed polarized light reflected by the polarization selective holographic element 18 is incident upon the mirror 26 whereon it is converted to left-handed circularly polarized light which, when incident on the polarization selective holographic element 18, is transmitted thereby. The left-handed circularly polarized light transmitted by the polarization selective holographic element 18 is incident upon a quarter wave plate 28 which converts the light to plane polarized light denoted by a dot in FIG. 6. This light is incident upon a polarization preserving diffuser 24 which distributes the plane polarized light to a liquid crystal display 14 including suitable colour filters.

Figure 7:
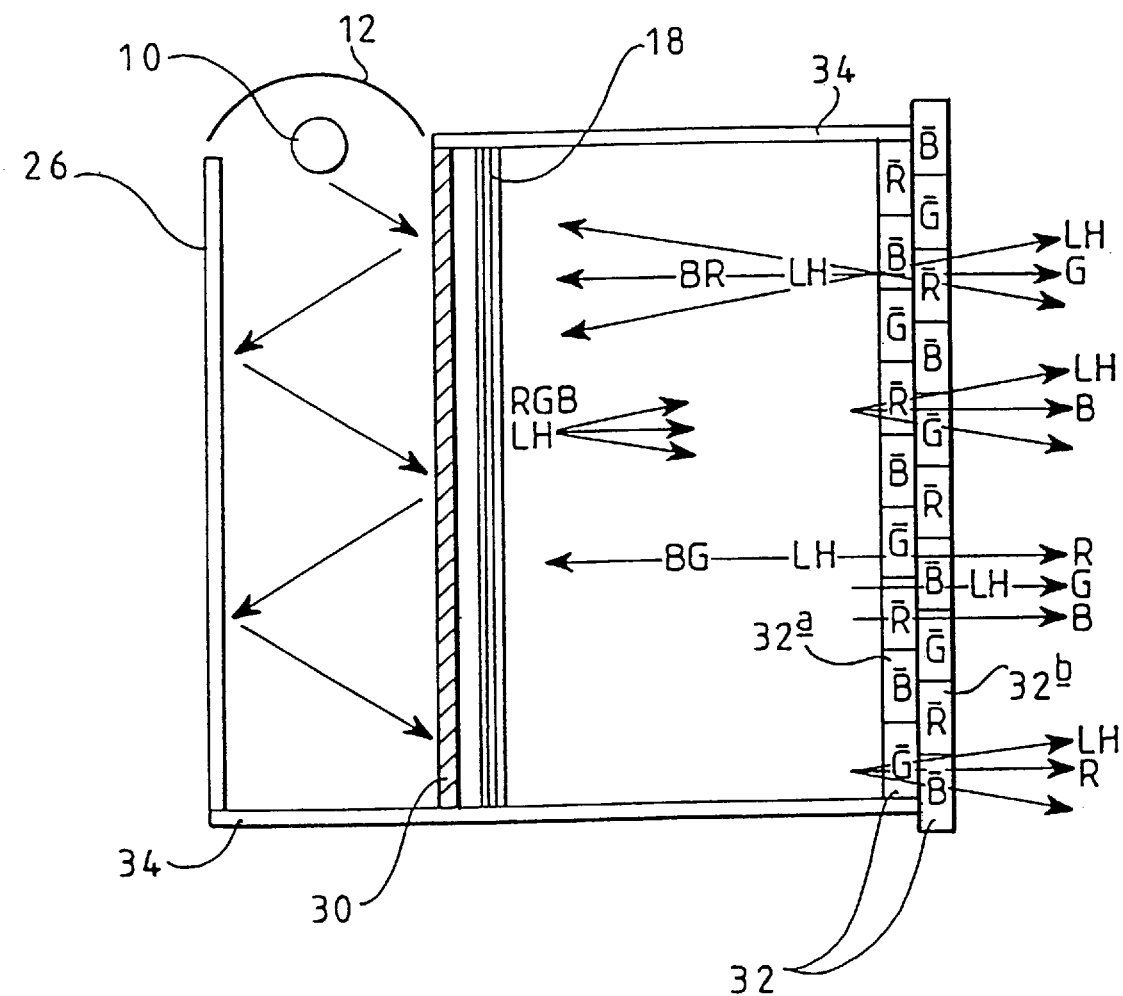
FIG. 7 is a view of a seventh embodiment of the invention.

FIG. 7 illustrates an illumination system which comprises a light source 10 taking the form of a fluorescent tube which emits white light, the red, green and blue components of which are denoted by R, G and B. The fluorescent tube is similar to that used in the embodiment illustrated in FIG. 1. Some of the light emitted by the fluorescent tube is incident upon a diffuser 30 which distributes the light evenly, the remaining light being incident thereon after reflection by a reflector 26. The light is then incident upon a polarization selective holographic element 18 which is arranged to transmit left-handed circularly polarized light (LH) and to reflect right-handed circularly polarized light (RH). The reflected light is incident upon the reflector 26 where it is converted to left-handed circularly polarized light which can then pass through the polarization selective holographic element 18. The left-handed circularly polarized light which is transmitted by the polarization selective holographic element 18 is incident upon a patterned colour selective holographic element 32.

The colour selective holographic element 32 comprises a first layer 32a of elements each of which is arranged to reflect light of one colour and to transmit the other two colours of light, the letters R, G and B denoting that red, green and blue light is reflected, respectively. Immediately adjacent the first layer 32a is a second layer 32b of elements. Each of these elements is also arranged to reflect light of one colour and to transmit light of the other two colours. As shown in FIG. 7, the two layers 32a, 32b of elements are arranged so that the elements of one layer are out of alignment with the elements of the other layer. The combined effect of the two layers 32a, 32b is to provide an element 32 in which only one colour of light is transmitted by each part of the element 32. The colours which are not transmitted by the element 32 are reflected back through the polarization selective holographic element 18 to be reflected by the reflector 26 and converted to right-handed circularly polarized light. As described above, the right-handed light cannot pass through the polarization selective holographic element 18 and is reflected thereby to be incident once more on the reflector 26 where it is converted to left-handed circularly polarized light. This component can then pass through the polarization selective holographic element 18 to be incident upon the colour selective holographic element 32 as described above. Reflectors 34 are provided in order to prevent or restrict the escape of light from the system other than through the element 32.

A liquid crystal display (not shown) is provided immediately adjacent the colour selective holographic element 32, each pixel of the liquid crystal display being arranged to receive only one colour of light from the colour selective holographic element 32. It will be recognised that the colour selective holographic element acts as a replacement for a series of individual absorbing colour filters.

If desired, an array of absorbing colour filters may be provided between the element 32 and the liquid crystal display in order to absorb any light of the "wrong" colour passing through the element 32. Since the amount of light absorbed by such filters will be small, the efficiency of the device will not be significantly reduced. These absorbing colour filters also help in reducing problems associated with light from outside of the system being reflected by the holographic elements.

The embodiment of FIG. 7 could be modified from the edgelit system illustrated to a backlit geometry, or alternatively a flat fluorescent lamp or edgelit system using a solid light pipe and microprism reflector could be used. The embodiment may further be modified by including a holographic element which reflects one component of plane polarized light, transmitting the other component.

The polarization selective holographic element 18 used in each of the above described embodiments may be formed in a polymer using optically induced birefringence, for instance using polarized light in a photoanisotropic thin polymeric film. Alternatively, it may comprise a stack of birefringent layers fabricated by means other than holography.

Figure 8:
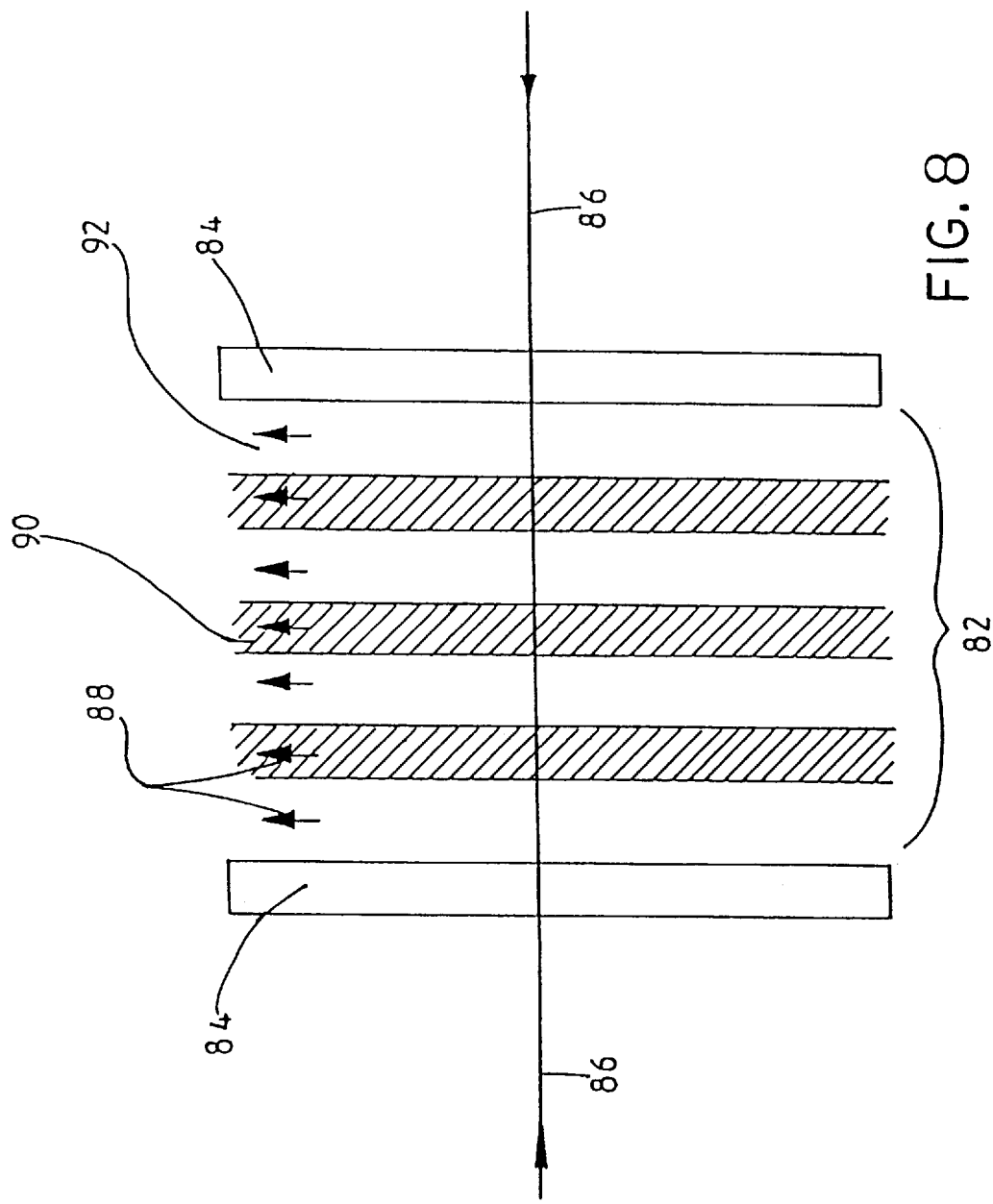
FIGS. 8 and 9 are schematic illustrations of some of the steps for making a holographic element in a liquid crystal polymer.
Figure 9:
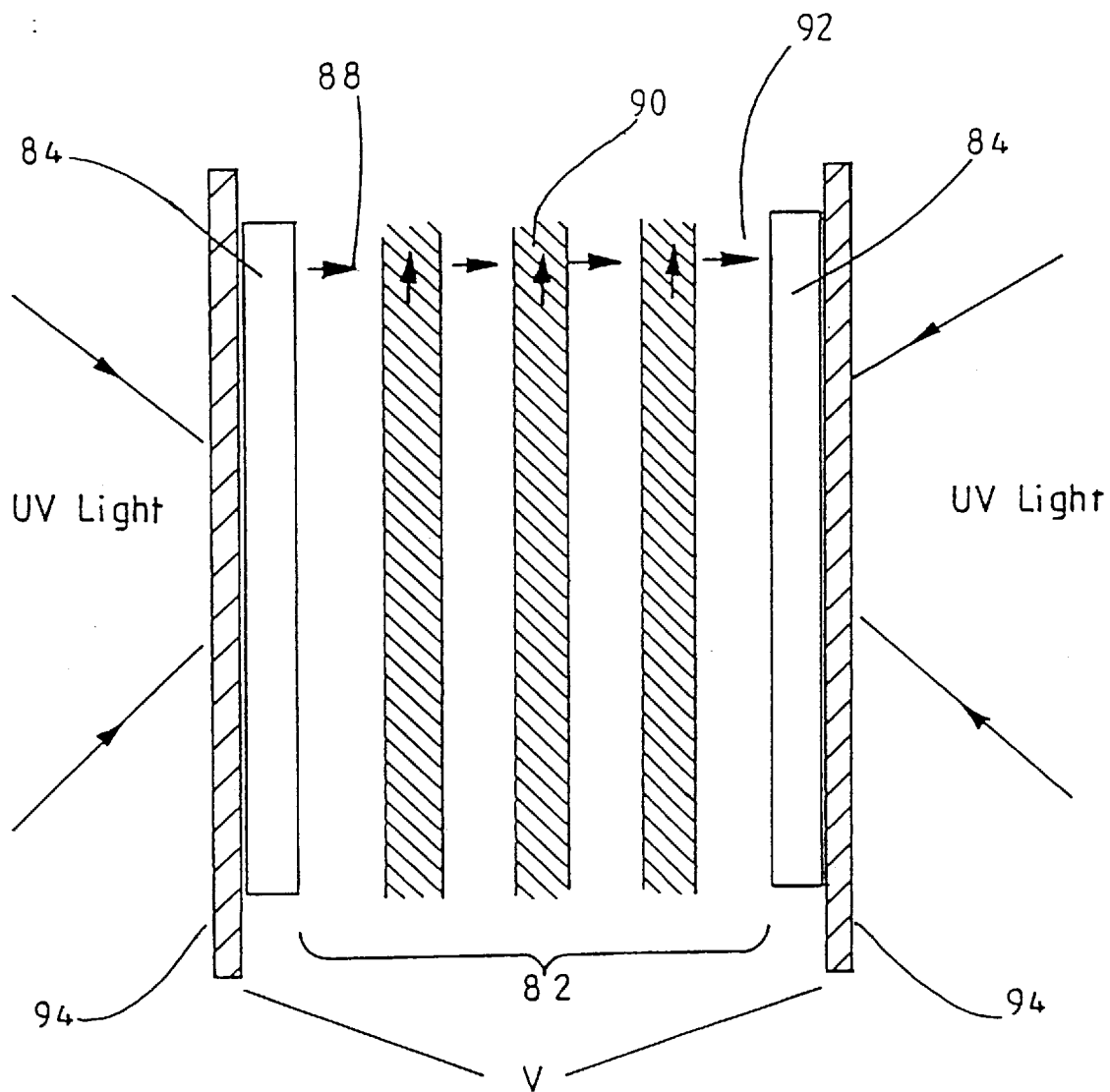

The holographic element 18 may be made using the technique disclosed in European Patent Application No. 95306328.6 and illustrated in FIGS. 8 and 9. An aligned liquid crystal polymer layer 82 is provided between a pair of glass substrates 84. The liquid crystal layer 82 is aligned using a suitable conventional technique, for example by providing the glass substrates 84 with rubbed polyamide alignment layers. The alignment layers may be arranged to cause the molecules of the liquid crystal material to align either in a direction parallel to the glass substrates 84, as shown or alternatively in a direction perpendicular to the glass substrates 84.

The liquid crystal layer 82 is irradiated from both sides by a pair of ultraviolet light beams 86 which interfere with one another to produce an interference pattern within the liquid crystal layer 82, the interference pattern extending substantially perpendicular to the glass substrates 84, and comprising a series of fringes.

The irradiation of the liquid crystal layer 82 causes cross-linking of the cross-linkable liquid crystal polymer chains in those regions, such as 90, of the layer 82 shown shaded where the interference pattern forms bright fringes, but not in the regions 92 where the interference pattern results in cancellation. The regions 90 of the liquid crystal layer in which cross-linking occurs become fixed, the director 88 of such regions 90 no longer reorienting, for example, on the application of an electric field thereto.

In order to fix permanently the interference pattern in the liquid crystal layer 82, the regions 92 are fixed with the directors 88 of the molecules of the regions 92 being oriented differently from the directors 88 of the molecules of the regions 90. One technique for achieving this is illustrated in FIG. 9 wherein transparent electrodes 94 are provided adjacent the glass substrates 84 and a voltage V is applied across the electrodes 94 in order to reorientate the molecules of those parts of the layer 82 which are not fixed, i.e. the regions 92. Once the regions 92 have been reorientated, the liquid crystal layer 82 is irradiated with ultraviolet light of uniform intensity. Such irradiation completely cross-links the liquid crystal polymers in the unfixed regions 92 so that, after the irradiation is complete, the liquid crystal layer 82 is fixed with the interference pattern forming a hologram therein.

The initial irradiation step may result in some regions of the layer 82 being partially cross-linked, the extent of cross-linking being dependent upon the intensity of the light incident thereon. The subsequent reorientation and irradiation steps result in the partially cross-linked regions being fully cross-linked. The resulting pattern fixed in the material may be a continuous pattern or a pattern including discontinuities.

As an alternative, after the initial irradiation step, the liquid crystal layer 82 may be heated to the isotropic phase and the layer 82 is uniformly irradiated to cross-link fully the unfixed regions 92 and any partially cross-linked regions.

In each of the described embodiments, the polarization selective holographic element 18 may be spaced from the liquid crystal display.

The colour selective holographic element in the embodiment of FIG. 7, however, should be immediately adjacent or preferably integral with the liquid crystal display in order to avoid cross-talk between the cells of the liquid crystal display intended to display light of different colours.

Since a holographic film of 10 μm thickness and refractive index variation, Δn, of 0.2 can reflect substantially 100% of light of a particular colour, each of the layers 32a, 32b is of thickness approximately 10 μm, the layer 32 having a total thickness of approximately 20 μm. In order to achieve an angular field of view of plus or minus 60°, the cholesteric pixel size is limited to at least 70 μm. By offsetting the layers 32a, 32b, the minimum reflective pixel size of the layer 32 is halved, permitting the use of a liquid crystal display therefore having a pixel size of 35 μm or more.

The angular acceptance bandwidth of a single 10 μm thick hologram with refractive index variation, Δn, of 0.2 is typically only ±20° which is less than the typical angular field of view of a liquid crystal display. By providing a multiplicity of holograms of slightly different pitch within the same region of the holographic elements 18, 32, it may be possible to increase the field of view for the holographic elements. Alternatively, the diffuser or other element(s) of the backlight or edgelight could be arranged to have a limited angular diffusing range so that the light within the illumination system remains within the acceptance bandwidth of the holographic elements 18, 32. To increase the angular field of view of the liquid crystal display device, a second diffuser may be placed after the liquid crystal display.

Where the illumination system is used in conjunction with a liquid crystal display requiring linearly polarized light rather than circularly polarized light, a patterned quarter wave plate or broadband quarter wave plate may be placed after the patterned holographic element 32 in order to convert the circularly polarized light into linearly polarized light.

Such a patterned quarter wave plate may be fabricated from a polymer which shows photo induced birefringence of the type described in Eurodisplay conference proceedings, LCT4 (1993).

What is claimed is:

1. An illumination system for a display device, comprising:
   a polarization selective element for separating light of a first polarization type from light of a second polarization type; and
   converting means for converting light of at least one of the first and the second polarization type into light of a common polarization type,
   wherein the polarization selective element is a holographic element comprising at least one optically anisotropic material, and the holographic element is of thin, substantially planar form and is substantially parallel to the converting means.

2. An illumination system as claimed in claim 1, wherein the converting means converts the light of the second polarization type to the light of the first polarization type.

3. An illumination system as claimed in claim 1, wherein the holographic element separates one type of elliptically polarized light from another type thereof.

4. An illumination system as claimed in claim 3, wherein the holographic element separates one type of circularly polarized light from another type thereof.

5. An illumination system as claimed in claim 4, wherein the holographic element transmits the light of the first polarization type and reflects the light of the second polarization type, and the converting means comprises a reflector.

6. An illumination system as claimed in claim 3, wherein the holographic element transmits the light of the first polarization type and reflects the light of the second polarization type, and the converting means comprises a waveplate and a reflector.

7. An illumination system as claimed in claim 1, wherein the holographic element separates one type of plane polarized light from an orthogonal type thereof.

8. An illumination system as claimed in claim 7, wherein the holographic element transmits the light of the first polarization type and reflects the light of the second polarization type, and the converting means comprises a quarter wave plate and a reflector.

9. An illumination system as claimed in claim 7, the holographic element transmits the light of the first polarization type in a first direction and transmits the light of the second polarization type in a second direction different from the first direction, and the converting means comprises an array of polarization rotators arranged to convert the light of at least one of the first and second polarization types into the light of the common polarization type.

10. An illumination system as claimed in claim 9, wherein the polarization rotators comprise half wave plates.

11. An illumination system as claimed in claim 9, wherein the array of polarization rotators forms a patterned polarization rotator including first regions which convert the light of the second polarization type to the light of the first polarization type and second regions which do not affect the polarization of light incident thereon.

12. An illumination system as claimed In claim 1, wherein the holographic element transmits the light of the first polarization type and reflects the light of the second polarization type.

13. An illumination system as claimed in claim 1, wherein the holographic element transmits the light of the first polarization type in a first direction and transmits the light of the second polarization type in a second direction different from the first direction.

14. An illumination system as claimed in claim 13, wherein the holographic element transmits light of a first wavelength in the first direction and light of a second wavelength in the second direction.

15. An illumination system as claimed in claim 14, wherein the holographic element transmits light of at least one further wavelength in at least one further direction different from the first and second directions.

16. An illumination system as claimed in claim 1, further comprising a light source for emitting light towards the holographic element.

17. An illumination system as claimed in claim 16, wherein the light source emits substantially unpolarized light.

18. An illumination system as claimed in claim 1, wherein the holographic element comprises an optically induced birefringent polymer.

19. An illumination system as claimed in claim 1, wherein the holographic element comprises a stack of birefringent layers of material other than optically induced birefringent polymer.

20. An illumination system as claimed in claim 1, wherein the holographic element comprises a cross-linked liquid crystal polymer.

21. An illumination system as claimed in claim 1, further comprising a patterned color selective holographic element optically in series with the polarization selective element to receive light therefrom.

22. A display device including an illumination system as claimed in claim 21 and a spatial light modulator including pixels optically aligned in correspondence with patterning in the patterned color selective holographic element, wherein the color selective holographic element is integral with the spatial light modulator.

23. A display device as claimed in claim 22, wherein the spatial light modulator comprises a liquid crystal display device.

24. A display device including an illumination system as claimed in claim 1 and a spatial light modulator optically in series with the polarization selective element to receive light therefrom.

25. A display device as claimed in claim 24, wherein the spatial light modulator comprises a liquid crystal display device.

26. An illumination system for a display device, comprising:

a polarization preserving diffuser;

a polarization selective element for separating light of a first polarization type from light of a second polarization type; and converting means for converting light of at least one of the first and the second polarization type into light of a common polarization type, wherein the polarization selective element is a holographic element comprising at least one optically anisotropic material, and wherein the light of a common polarization type passes through the polarization preserving diffuser.

* * * * *